United States Patent
Zhang et al.

(10) Patent No.: US 12,430,101 B2
(45) Date of Patent: Sep. 30, 2025

(54) METHOD AND SYSTEM FOR DESIGNING PROJECT PROCESS BASED ON DATA AND MATCHING MODEL

(71) Applicants: DIGIWIN CO., LTD., Shanghai (CN); DATA SYSTEMS CO., LTD., New Taipei (TW)

(72) Inventors: Tuo Zhang, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 24 days.

(21) Appl. No.: 18/362,988

(22) Filed: Aug. 1, 2023

(65) Prior Publication Data

US 2024/0427560 A1    Dec. 26, 2024

(30) Foreign Application Priority Data

Jun. 20, 2023 (CN) .......................... 202310735865.1

(51) Int. Cl.
*G06F 8/20* (2018.01)
*G06F 8/10* (2018.01)

(52) U.S. Cl.
CPC . *G06F 8/24* (2013.01); *G06F 8/10* (2013.01)

(58) Field of Classification Search
CPC ..................................... G06F 8/24; G06F 8/10
USPC .................................................. 717/101–120
See application file for complete search history.

(56) References Cited

U.S. PATENT DOCUMENTS

| | | | |
|---|---|---|---|
| 6,345,239 B1 * | 2/2002 | Bowman-Amuah | G06Q 30/0639 705/26.9 |
| 6,427,132 B1 * | 7/2002 | Bowman-Amuah | G06Q 30/02 703/22 |
| 6,523,027 B1 * | 2/2003 | Underwood | G06F 9/465 |
| 6,611,867 B1 * | 8/2003 | Bowman-Amuah | H04L 41/5025 709/224 |

(Continued)

OTHER PUBLICATIONS

Ma et al., "Research on the Phenomenon of Software Drift in Software Processes", IEEE, pp. 1-4 (Year: 2005).*

(Continued)

*Primary Examiner* — Anil Khatri
(74) *Attorney, Agent, or Firm* — JCIPRNET

(57) ABSTRACT

A processing method and a processing system of a project process are provided. The processing method includes the following steps. A processor defines a matching model according to a relationship among a plurality of pieces of document data and a relationship between the document data and a plurality of components. The processor calculates the components according to the matching model to output a plurality of recommended components in a design phase of a target project. The processor performs a packaging operation to form a plan according to a plurality of selected components. Each of a plurality of nodes in the plan includes corresponding plan coordinates. The processor specifies a first node among the nodes as a starting node to start executing the target project according to plan coordinates of an input data instance in a running phase. The first node and the input data instance have the same plan coordinates, so the project process is accordingly designed based on data.

18 Claims, 11 Drawing Sheets

(56) References Cited

U.S. PATENT DOCUMENTS

| | | | | |
|---|---|---|---|---|
| 7,822,592 B2* | 10/2010 | Hawkins | ............... | G06Q 99/00 |
| | | | | 706/6 |
| 8,214,238 B1* | 7/2012 | Fairfield | ............ | G06Q 30/0203 |
| | | | | 705/7.29 |
| 8,285,522 B1* | 10/2012 | Tryon, III | ............... | G06F 30/20 |
| | | | | 703/2 |
| 8,832,640 B1* | 9/2014 | Roche | ..................... | G06F 8/20 |
| | | | | 717/101 |
| 10,656,635 B2* | 5/2020 | Hallihole | ............... | G06N 5/022 |
| 11,137,751 B2* | 10/2021 | Narayanan | ............ | G06F 30/20 |
| 11,501,255 B2* | 11/2022 | Mann | ............... | G06F 16/24564 |
| 11,763,046 B2* | 9/2023 | Harris | ..................... | G06F 30/15 |
| | | | | 703/7 |
| 2002/0184610 A1* | 12/2002 | Chong | ..................... | G06F 8/20 |
| | | | | 717/109 |
| 2005/0234688 A1* | 10/2005 | Pinto | ..................... | G05B 17/02 |
| | | | | 703/13 |

OTHER PUBLICATIONS

Hachemi, "Software Development Process Modeling with Patterns", ACM, pp. 1-5 (Year: 2020).*

Gupta et al, "Design Pattern Detection Using Inexact Graph Matching", ACM, pp. 1-7 (Year: 2010).*

Saeki et al, "Reference model selection for a model-matching data-driven control design", IEEE, pp. 1-6 (Year: 2013).*

Strüber et al, "Tool Support for Clustering Large Meta-Models", ACM, pp. 1-4 (Year: 2013).*

Jeon et al, "Synthesizing Framework Models for Symbolic Execution", ACM, pp. 1-12 (Year: 2016).*

* cited by examiner

METHOD AND SYSTEM FOR DESIGNING PROJECT PROCESS BASED ON DATA AND MATCHING MODEL

CROSS-REFERENCE TO RELATED APPLICATION

This application claims the priority benefit of China application serial no. 202310735865.1, filed on Jun. 20, 2023. The entirety of the above-mentioned patent application is hereby incorporated by reference herein and made a part of this specification.

BACKGROUND

Technical Field

The disclosure relates to a processing method, and in particular, relates to a processing method and a processing system for designing and running a project process.

Description of Related Art

An enterprise can design the process of the target project through a workflow engine, so as to implement various business services by connecting a plurality of tasks in series. However, the currently-available workflow engine designs the project processes based on the process instances, so when the workflow engine is running a project, it will encounter the following scenarios and the project cannot be continued as a result. For instance, when the materials required by the manufacturing industry need to be split, the running project cannot perform batch processing for this material or jump to other processes. Furthermore, when various materials need to be merged and processed based on commonality, the running project cannot perform corresponding processing on these materials. For another instance, when the material is changed, the running project cannot respond to the change, resulting in an abnormal process.

SUMMARY

The disclosure provides a processing method of a project process applied to the manufacturing industry and capable of designing a project process based on data to improve the operational flexibility of the project process.

According to an embodiment of the disclosure, the disclosure provides a processing method of a project process, and the method includes the following steps. A processor defines a matching model according to a relationship among a plurality of pieces of document data and a relationship between the document data and a plurality of components. The processor calculates the components according to the matching model to output a plurality of recommended components in a design phase of a target project. The processor performs a packaging operation to form a first plan according to the components and a plurality of selected components among the recommended components in the design phase. Each of a plurality of nodes in the first plan includes corresponding plan coordinates. The processor specifies a first node among the nodes as a starting node for executing an input data instance in the target project to start executing the target project according to plan coordinates of the input data instance in a running phase. The first node and the input data instance have the same plan coordinates.

According to an embodiment of the disclosure, the disclosure further provides a processing system of a project process including a storage device and a processor. The storage device stores a matching model. The processor is coupled to the storage device. The processor executes the following operations. A matching model is defined according to a relationship among a plurality of pieces of document data and a relationship between the document data and a plurality of components. The components are calculated according to the matching model to output a plurality of recommended components in a design phase of a target project. A packaging operation is performed to form a first plan according to the components and a plurality of selected components among the recommended components in the design phase. Each of a plurality of nodes in the first plan includes corresponding plan coordinates. A first node among the nodes is specified as a starting node for executing an input data instance in the target project to start executing the target project according to plan coordinates of the input data instance in a running phase. The first node and the input data instance have the same plan coordinates.

To sum up, in the processing method and the processing system of the project process provided by the disclosure, by packaging the selected components into the plan according to the matching model associated with the data, the target project of the data instance architecture is built. Therefore, in the processing method of the project process, the starting node is specified according to the plan coordinates of the input data instance at running to meet various needs of the data, so that the operational flexibility of the target project is improved.

To make the aforementioned more comprehensible, several embodiments accompanied with drawings are described in detail as follows.

DESCRIPTION OF THE EMBODIMENTS

Figure 1:
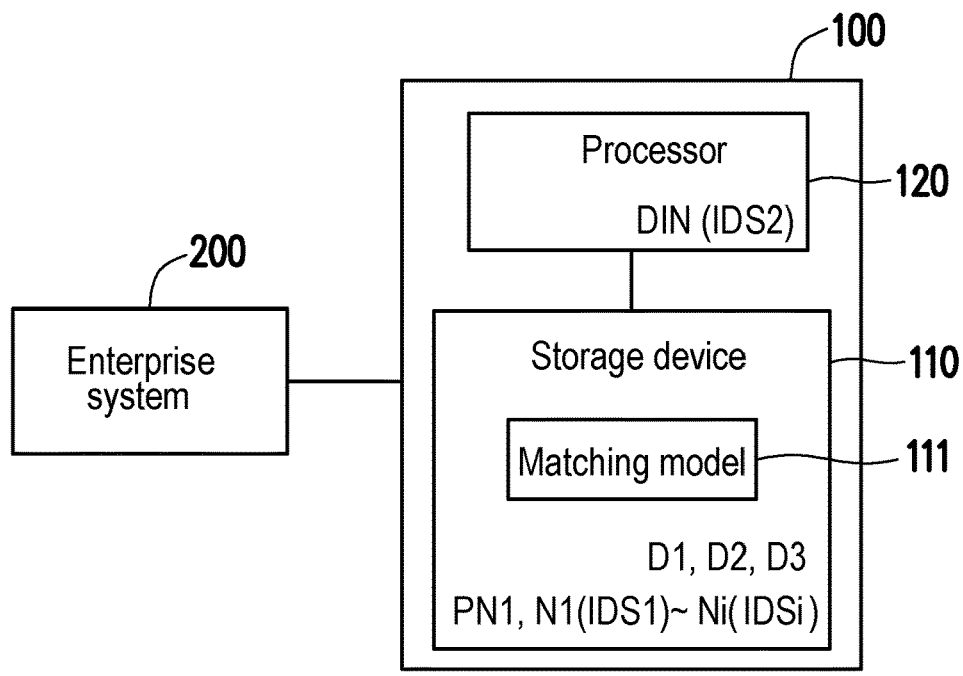
FIG. 1 is a circuit block diagram of a processing system of a project process according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

FIG. 1 is a circuit block diagram of a processing system of a project process according to an embodiment of the disclosure. With reference to FIG. 1, a processing system 100 of a project process is applied to data mining and a workflow engine. The processing system 100 performs a packaging operation according to application data such as a data type, a state, and a feature of source data in an enterprise system 200 to create an executable target project.

In this embodiment, the processing system 100 of the project process may be set up on the cloud for a user to execute the processing system 100 by connecting with an electronic apparatus. The processing system 100 may be, for example, a software as a service (SaaS) server, so as to execute a corresponding SaaS application through an application programming interface (API). In some embodiments, the processing system 100 may be set up on the premise in an enterprise, so that the user may connect the processing system 100 with other systems set up on the cloud through the electronic apparatus to input/output data and to accordingly execute the corresponding SaaS application through the API.

In this embodiment, the processing system 100 is coupled to the enterprise system 200. The processing system 100 may call the enterprise system 200 through the API to access and process the source data in the enterprise system 200. The source data may include, for example, various documents and various orders related to business services. In this embodiment, the user may operate the electronic apparatus to execute the enterprise system 200 through the API and then executes various business services through the enterprise system 200. For instance, the electronic apparatus may call the enterprise system 200 through the API, so as to perform various functions (such as approving a purchase order) in a manufacturing scenario application. The enterprise system 200 may be, for example, an enterprise resource planning (ERP) system. The electronic apparatus may be, for example, a mobile phone, a tablet computer, a notebook computer, a desktop computer, and the like.

In this embodiment, the processing system 100 may include a storage device 110 and a processor 120. The storage device 110 stores a matching model 111. The storage device 110 accesses the enterprise system 200 to obtain the source data. In this embodiment, the storage device 110 may also store computing software, etc., which is used to implement related algorithms, programs, and data for functions such as data mining, software designing, software packaging, various calculations, testing, software operating, etc. in the disclosure. The storage device 110 may be, for example, a dynamic random access memory (DRAM), a flash memory, a non-volatile random access memory (NVRAM), or a combination of the foregoing.

In this embodiment, the processor 120 is coupled to the storage device 110. The processor 120 accesses the storage device 110 and may execute data store in the storage device 110 and the source data from the enterprise system 200. In this embodiment, the processor 120 may be, for example, a signal converter, a field programmable gate array (FPGA), a central processing unit (CPU), a programmable microprocessor for general or special use, a digital signal processor (DSP), a programmable controller, an application specific integrated circuit (ASIC), a programmable logic device (PLD), other similar devices, or a combination of these devices, and the processor 120 may load and execute computer program-related firmware or software to implement functions such as data mining, software designing, software packaging, various calculations, testing, software operating, and executing.

Figure 2:
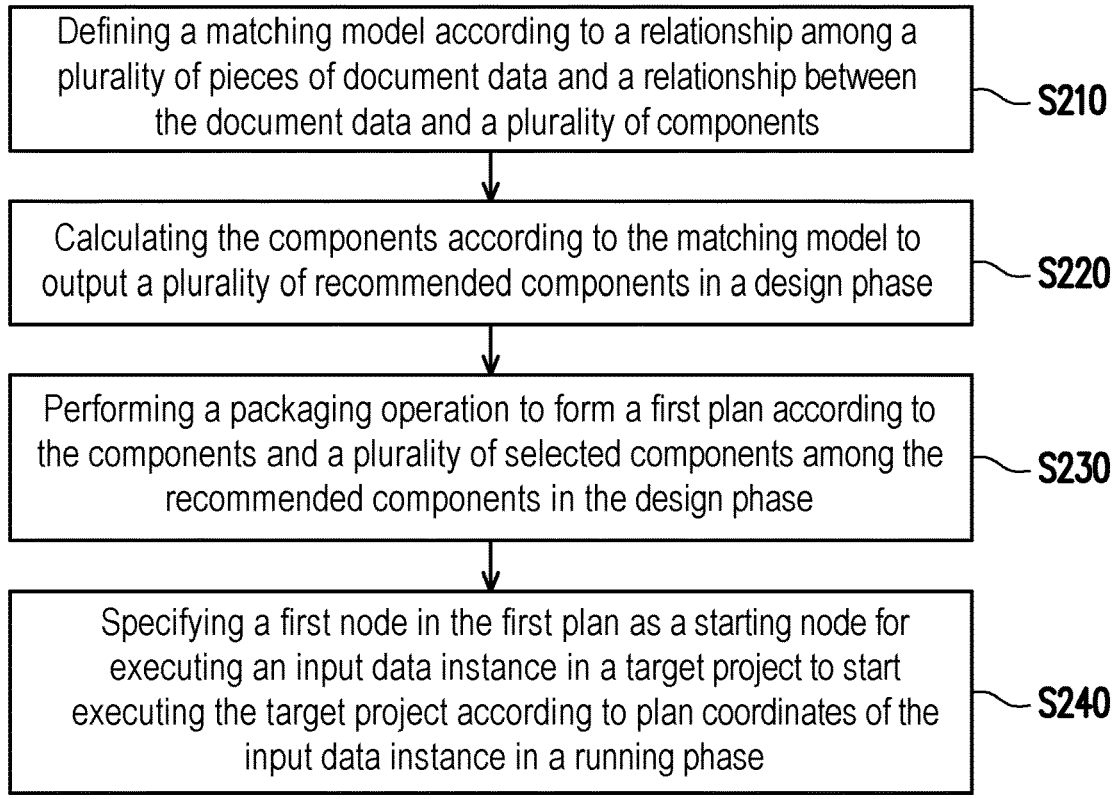
FIG. 2 is a flow chart of a processing method of the project process according to an embodiment of the disclosure.

FIG. 2 is a processing method of a project process according to an embodiment of the disclosure. With reference to FIG. 1 and FIG. 2, the processing system 100 may execute the following steps S210 to S240. The order of these steps S210 to S240 is only for illustration and not limited thereto. In this embodiment, steps S210 to S240 may be applied to the following exemplary situations.

In this embodiment, the processor 120 accesses and process the source data in the enterprise system 200. The processed source data may include, for example, a plurality of pieces of document data D1 and a plurality of components D2. These document data D1 may be, for example, instantiated source data to indicate various state features related to the documents. These components D2 may be, for example, instantiated source data to indicate various logical features related to document processing.

In step S210, the processor 120 define the matching model 111 according to a relationship among the document data D1 and a relationship between the document data D1 and the components D2. The matching model 111 may be, for example, a structured data model to indicate the relationship between various data D1 and D2.

In this embodiment, the processing system 100 is operable at design time to package one or more plans into an executable target project. In detail, in step S220, in a design phase of the target project, the processor 120 calculates the components D2 according to the matching model 111 to output a plurality of recommended components D3. That is, the processor 120 executes data driving according to the matching model 111 and the components D2, so as to select the recommended components D3 with associations from the components D2.

Continuing with the above description, in step S230, the processor 120 performs a packaging operation to form a first plan PN1 according to the components D2 and a plurality of selected components among the recommended components D3 in the design phase. That is, the user operates the electronic apparatus to access the components D2 and the recommended components D3, so that the user and the processing system 100 process (e.g., select) the selected components as required components in the target project in an alternating manner. In this embodiment, the processor 120 may repeatedly execute step S230 for multiple times to form other one or more plans (not shown).

In this embodiment, the first plan PN1 may include a plurality of nodes N1 to Ni, where i is a positive integer. Each of these nodes N1 to Ni may include one or more selected components. These nodes N1 to Ni indicate various process operations. These nodes N1 to Ni may respectively include a plurality of plan coordinates IDS1 to IDSi as well. These plan coordinates IDS1 to IDSi respectively indicate the positions of these nodes N1 to Ni in the target project. For instance, a first node M1 among the nodes N1 to Ni includes the plan coordinates IDS1 to indicate that this node N1 is located at a specific node N1 in the first plan PN1.

In this embodiment, the processing system 100 is operable in a running phase to execute the target project according to input data. In the running phase, the processing system 100 accesses and processes the input data in the enterprise system 200. The input data may be, for example, data to be processed (e.g., an actual order) in the enterprise system 200. An input data instance DIN may be, for example, instantiated input data. The input data instance DIN may include the plan coordinates IDS2. The plan coordinates IDS2 indicate the position in the target project of the operation associated with the input data instance DIN.

In detail, in step S240, in the running phase, the processor 120 specifies the first node (e.g., node N1) as a starting node for executing the input data instance DIN in the target project to start executing the target project according to the plan coordinates IDS2 of the input data instance DIN. That is, the processor 120 finds the matching node N1 in the process according to a feature (e.g., plan coordinates IDS2) of the input data instance DIN and starts executing the target project based on the node N1.

In this embodiment, the first node N1 acting as the starting node and the input data instance DIN have the same plan coordinates. That is, the plan coordinates IDS1 of the first node N1 and the plan coordinates IDS2 of the input data instance DIN are the same.

It is worth mentioning herein that the processing method of the project process is a data-based design and operation method. By packaging the selected components into the first plan PN1 according to the matching model 111 associated with the data, the target project of a data instance architecture can be built through the processing method. In this way, when running the target project, the processing method may specify the starting node according to the plan coordinates IDS2 of the input data instance DIN, so as to meet various requirements of the input data, the source data, etc. in the enterprise system 200, to be accordingly applied to the manufacturing industry, and to improve the operational flexibility of the project process.

Figure 3:
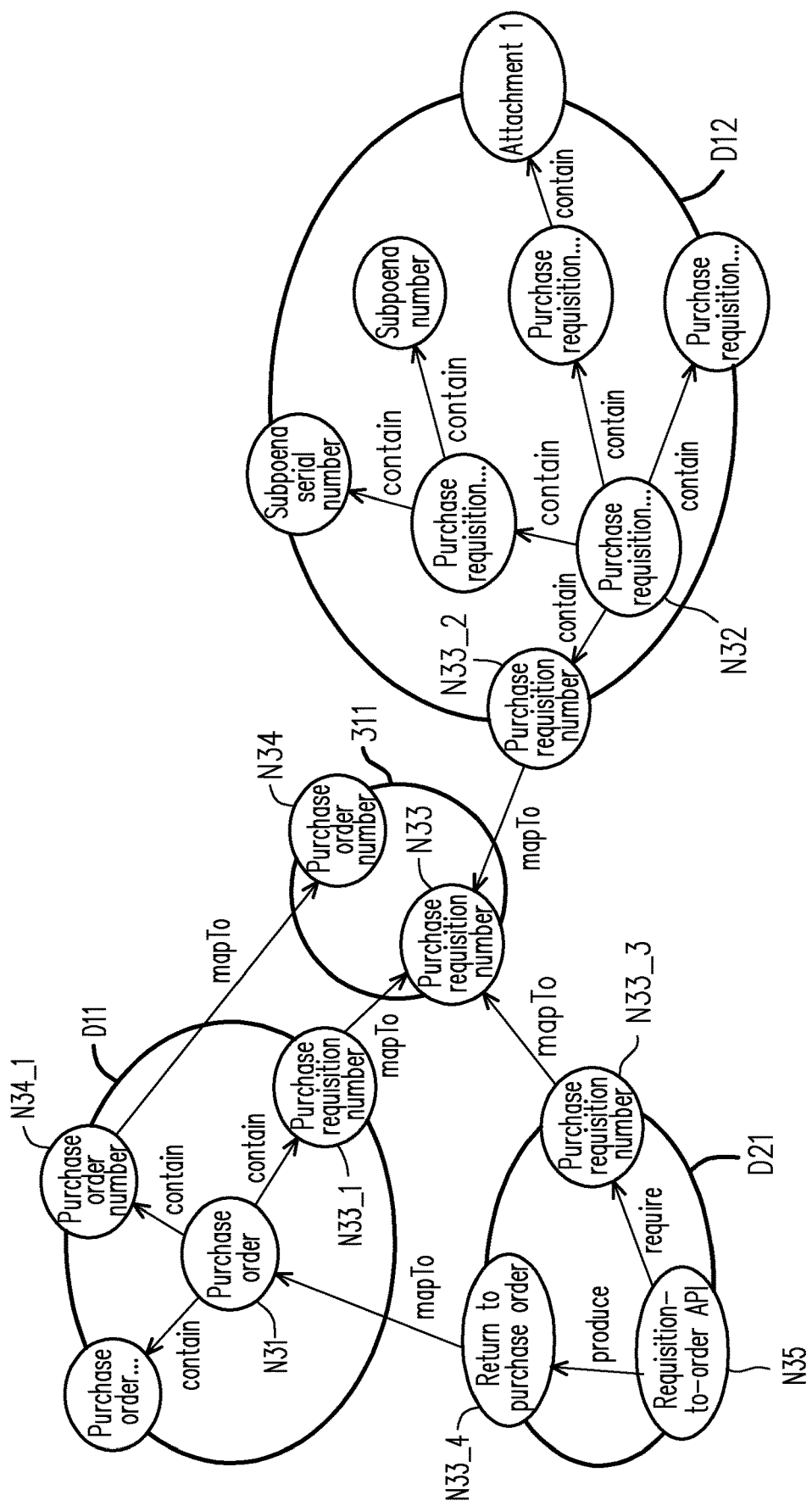
FIG. 3 is a schematic diagram of an operation performed by the processing system according to an embodiment of the disclosure.

FIG. 3 is a schematic diagram of an operation performed by the processing system according to an embodiment of the disclosure. With reference to FIG. 1 and FIG. 3, the processing system 100 of the project process builds a data instance architecture and defines the matching model 111 (e.g., a registration entity 311 in FIG. 3) according to the source data (e.g., a plurality of documents) in the enterprise system 200. The implementation details of instantiating the document data D1 and the component D2 and step S210 are illustrated by examples.

In this embodiment, the processor 120 accesses a plurality of documents in the enterprise system 200. These documents may be, for example, various documents related to business services and may include documents such as purchase requisitions, purchase orders, maintenance orders, etc. in the physical world.

In this embodiment, the processor 120 performs instantiation and data mining on the documents to produce the document data D1 and the components D2. To be specific, the processor 120 performs data mining on the documents to produce a plurality of features related to the documents. In addition, the processor 120 instantiates these features to produce the document data D1 and the components D2 having an ontology structure. The processor 120 may also perform data mining on the document data D1 and the components D2 to enrich the document data D1 and the components D2. That is, the processor 120 maps the data in the physical world to the knowledge ontology in the digital world and creates instantiated attributes and logical relationships between these data, so as to form a huge and complex relationship network (i.e., the matching model 111).

In detail, the document data D1 is a first multivariate structural data and may be abstracted as a data ontology. The data ontology indicates a specific type of data and may be further abstracted into other multiple related sub-data ontologies by the processor 100.

In this embodiment, the definition of the first multivariate structural data (i.e., data ontology) may include structures such as a data type definition, a data field description, a unique key in the data, and a state of the data. The data type definition indicates that the document data D1 belongs to a specific type of data, such as financial data such as a purchase order or a purchase requisition. The data field description indicates the fields included in the document data D1, such as order number, ordering person, time, and other fields. The unique key in the data indicates that a specific field included in the document data D1 may identify the document data D1 as a unique identifier of the document data D1. The state of the data indicates the state of this document data D1.

In this embodiment, the relationship between different first multivariate structural data (i.e., data ontologies) may include relationships such as an inheritance relationship, a mapping relationship, and an inclusion relationship. The inheritance relationship indicates that there is an inheritance relationship between a plurality of data ontologies, for example, human beings inherit from animals. The mapping relationship indicates that a plurality of data ontologies have the same meaning, for example, apple in Chinese and apple in English have the same meaning. The inclusion relationship indicates that a plurality of data ontologies have a tree relationship to include definitions of other data ontologies, for example, a family includes father, mother, and children.

For instance, as shown in FIG. 3, the document data D1 may include, for example, purchase order data D11 and purchase requisition data D12. The purchase order data D11 defines a purchase order based on the node N31. The purchase order data D11 may include a field description node N33_1 representing "purchase requisition number" and a field description node N34_1 representing "purchase order number". The purchase requisition data D12 defines a purchase requisition based on the node N32. The purchase requisition data D12 may include a field description node N33_2 representing "purchase requisition number".

In addition, the components D2 are second multivariate structural data and may be abstracted as a component ontology. The component ontology indicates specific logical concepts and may be further abstracted by the processor 100 into other multiple related sub-component ontologies.

In this embodiment, the second multivariate structural data (i.e., component ontology) is configured to process data and combine with other component ontologies to complete various complex business logics. The type of the component ontology may include types such as an execution-type component, a determination-type component, a control-type component, a storage-type component, and a user interface (UI)-type component. The execution-type component indicates to execute a piece of logic, such as calling an API, and execute a script and other logics. The determination-type component indicates the execution of logical determination. The control-type component indicates the execution of the control process, such as stop, pause, loop, gateway and other processes. The storage-type component indicates the storage or retrieval of data. The UI-type component indicates to display the data.

In this embodiment, the relationship between different second multivariate structural data (i.e., component ontologies) may include relationships such as a dependency relationship, an output relationship, and an inclusion relationship. The dependency relationship indicates that the execution of a component ontology depends on other data ontologies or other component ontologies. The output relationship indicates that the execution of the component ontology includes external output, for example, some parameters are returned in the operation of calling the API. The inclusion relationship indicates that there is a tree relationship between multiple component ontologies to include other component ontologies, for example, a large component ontology is composed of multiple small component ontologies.

For instance, as shown in FIG. 3, the component D2 may include, for example, an API component D21 for converting a purchase requisition into a purchase order (i.e., requisition-to-order). The requisition-to-order API component D21 defines a logic for executing API calling based on the node N35. The requisition-to-order API component D21 may include a dependent node N33_3 representing "purchase requisition number" and an output node N33_4 representing "return to purchase order". That is, the requisition-to-order API component D21 depends on a field of purchase requisition number and accordingly produces a purchase order.

In this embodiment, the matching model 111 includes structural data matched with the document data D1 (i.e., first multivariate structural data) and the components D2 (i.e., second multivariate structural data). That is, the matching model 111 indicates the ontology relationship between the first multivariate structural data (i.e., data ontology) and the second multivariate structural data (i.e., component ontology) and expresses the ontology relationship with a relationship graph.

For instance, as shown in FIG. 3, the matching model 111 may include the registration entity 311. The registration entity 311 defines a registration entity related to a purchase requisition. The registration entity 311 may include a node N33 representing "purchase requisition number" and a node N34 representing "purchase order number". The registration entity 311 may be formed by mapping the data structures having equivalent meanings in the purchase order data D11, the purchase requisition data D12, and the requisition-to-order API component D21 into one entity.

Figure 4:
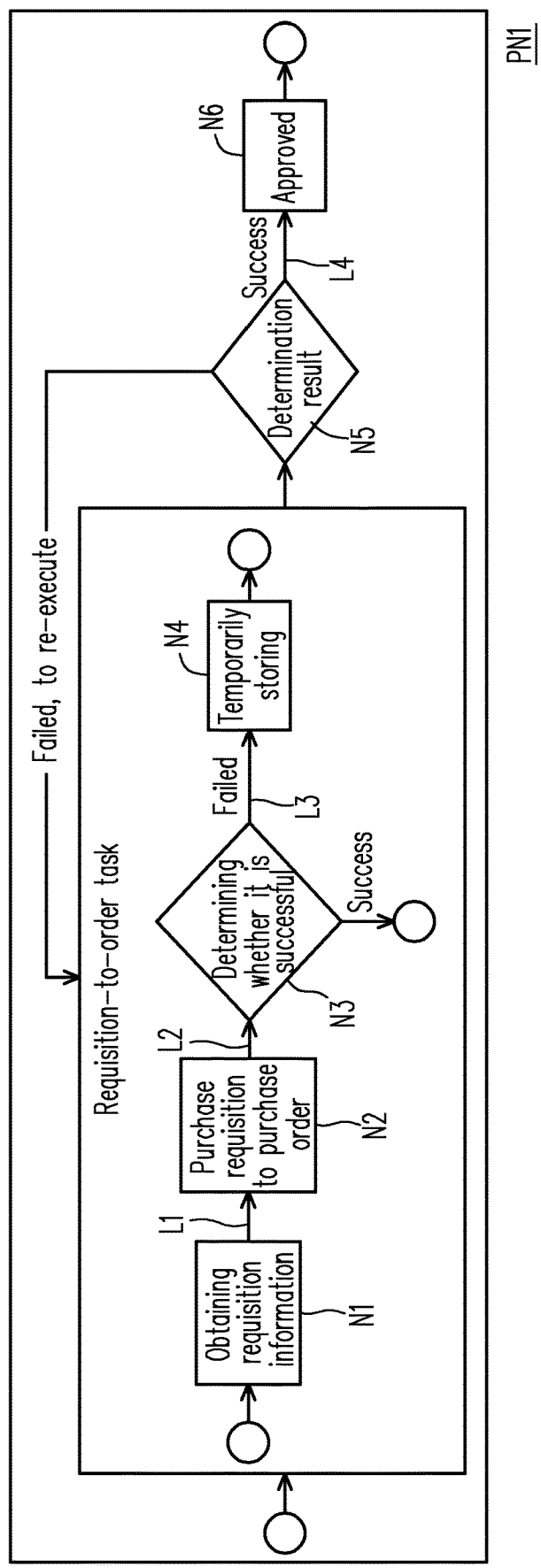
FIG. 4 is a schematic diagram of an operation performed by the processing system in a design phase according to an embodiment of the disclosure.

FIG. 4 is a schematic diagram of an operation performed by the processing system in the design phase according to an embodiment of the disclosure. With reference to FIG. 1 and FIG. 4, the processing system 100 of the project process operates at design time. The implementation details of steps S220 to S230 are illustrated by examples.

During the design time, the processor 120 produces one plan (e.g., first plan PN1) by building various components D2 to D3 and produces a final target project by building various plans. The aforementioned building between the various components D2 to D3 and among the various plans are multiple executable processes indicating corresponding business services.

In this embodiment, since the processing system 100 builds the data instance architecture including the document data D1, the components D2, and the matching models 111, etc., the processing system 100 may perform data driving through the processor 100 according to the matching model 111 to recommend a plurality of suitable recommended components D3. In some embodiments, the processor 100 may further recommend the packaged plan stored in the storage device 110 according to the matching model 111, so as to provide the user and the processing system 100 for use or use after modification in an alternating manner.

In this embodiment, the user and the processing system 100 perform processing in an alternating manner, so as to select components (i.e., selected components) used in the design process among the components D2 and the recommended components D3 recommended by the processor 100. Next, the user and the processing system 100 perform processing in an alternating manner, so as to package these selected components into one or more plans according to a flow structure and package the aforementioned plans into the target project of a target.

In detail, taking the design of the first plan PN1 as an example, the processor 120 assembles a plurality of selected components to produce a plurality of nodes N1 to N6. That is, each of the nodes N1 to N6 may include one or more selected components (which may be the different components D2). For instance, the node N1 is a module expressed "obtain purchase requisition information" and includes one or more calling API components. The node N2 is a module representing "purchase requisition to purchase order" and includes one or more calling API components. The node N3 is a module representing "determining whether it is successful" and includes one or more control-type components. The node N4 is a module representing "temporary storage" and includes one or more storage-type components. The node N5 is a module representing "determination result" and includes one or more determination-type components. The node N6 is a module representing "approval" and includes one or more execution-type components.

In addition, taking the design of the first plan PN1 as an example, the processor 120 connects multiple nodes N1 to N6 in series according to a plurality of directed links L1 to L4 to form the first plan PN1. That is, each of the directed links L1 to L4 is directed from one node to another node and may include one or a plurality of conditions. For instance, the directed link L1 is directed from node N1 to node N2. The directed link L2 is directed from node N2 to node N3. The directed link L3 is a line segment representing "failure" and is directed from node N3 to node N4. The directed link L4 is a line segment representing "success" and is directed from node N5 to node N6.

It should be noted that the first plan PN1 includes a first identifier. The first identifier acts as the unique entity identifier of this plan PN1 and may be denoted as planId. In this plan PN1, the nodes N1 to N6 include a plurality of different second identifiers. These second identifiers act as unique entity identifiers of these nodes N1 to N6 in the plan PN1 and may be denoted as nodeId. In this way, the plan coordinates of each of the nodes N1 to N6 include the first identifier planId and the corresponding second identifier nodeId. That is, the plan coordinates of the node N1 may be expressed as two-dimensional coordinates of (planId, nodeId), which act as positioning coordinates in the entire target project. The other nodes N2 to N6 include their own independent plan coordinates, so that the processor 100 may directly locate specific nodes N2 to N6 according to the plan coordinates.

Figure 5:
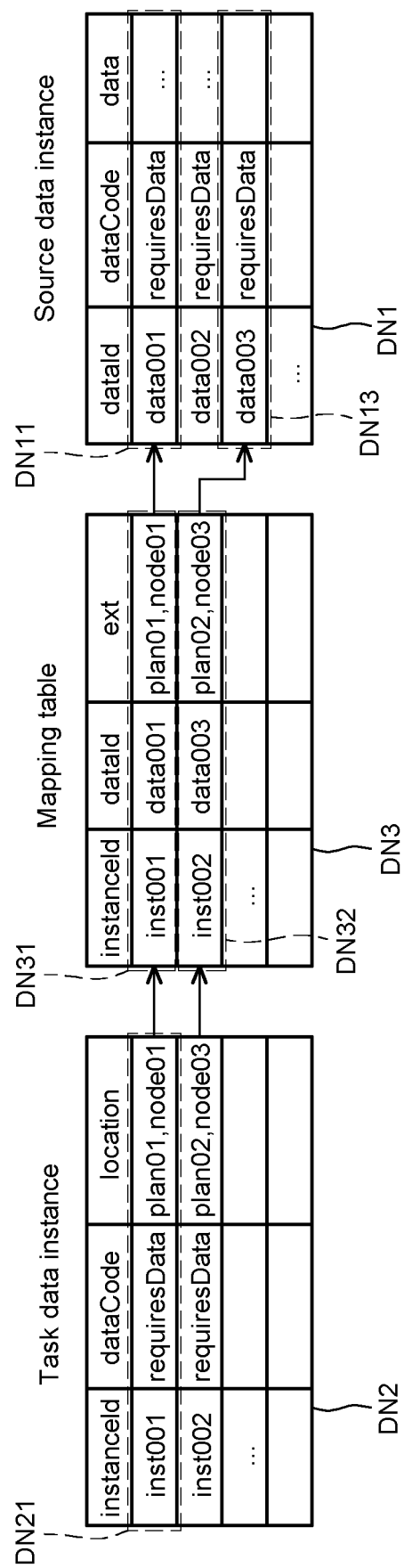
FIG. 5 is a schematic diagram of an operation performed by the processing system according to an embodiment of the disclosure.

FIG. 5 is a schematic diagram of an operation performed by the processing system according to an embodiment of the disclosure. With reference to FIG. 1 and FIG. 5, according to the source data (e.g., a plurality of orders or a plurality of documents) in the enterprise system 200, the processing system 100 of the project process packages a batch of specific data and defines a mapping table related to the aforementioned specific data. The implementation details related to step S240 are illustrated by examples.

In this embodiment, the processor 120 accesses a plurality of documents and a plurality of pieces of task data in the enterprise system 200. These documents may be, for example, various documents related to business services and may include documents such as purchase requisitions, purchase orders, maintenance orders, etc. in the physical world. Such task data may be, for example, various specific orders related to business services and may include combinations of various documents. That is, each task data may include one or more corresponding documents.

In this embodiment, the processor 120 instantiates the documents and the task data to respectively produce a plurality of source data instances DN1 and a plurality of task data instances DN2. The processor 120 defines a mapping table according to a relationship between the source data instances DN1 and the task data instances DN2. That is to say, the processor 120 maps the real data to be substituted into the process into the digital world and creates the instantiated mapping relationship between these data, so as to form a mapping table DN3.

In detail, the plurality of source data instances DN1 are instantiated various documents. Each of the source data instances DN1 may include a corresponding third identifier (denoted as "dataId") and a corresponding data (denoted as "data"). These third identifiers act as unique entity identifiers of the plurality of source data instances DN1. These documents are the documents themselves of plurality of source data instances DN1. In this embodiment, the plurality of source data instances DN1 are stored in the storage device 110.

For instance, taking a source data instance DN11 as an example, the source data instance DN11 is an instantiated document (e.g., a purchase requisition). The source data instance DN11 may include a third identifier denoted "data001". This third identifier ("data001") acts as the unique entity identifier of this source data instance DN11. In addition, taking a source data instance DN13 as an example, the source data instance DN13 is an instantiated certain document (e.g., a purchase order). The source data instance DN13 may include a third identifier denoted "data003". This third identifier ("data003") acts as the unique entity identifier of this source data instance DN13. The source data instances DN11 and DN13 may also include structural data such as corresponding documents (e.g., purchase requisitions), source data types, and source data states.

In addition, the plurality of task data instances DN2 are instantiated various specific orders. Each of the task data instances DN1 may include a corresponding fourth identifier (denoted as "instanceId") and corresponding plan coordinates (denoted as "location"). These fourth identifiers act as unique entity identifiers of the plurality of task data instances DN2. These plan coordinates are the current positions of plurality of task data instances DN2 when executing the target project.

For instance, taking a task data instance DN21 as an example, the task data instance DN21 is an instantiated order (e.g., an order including a purchase requisition and a purchase order). The task data instance DN21 may include a fourth identifier denoted "inst001". This fourth identifier ("inst001") acts as the unique entity identifier of this task data instance DN21. The task data instance DN21 may include plan coordinates denoted "plan01, node01". The plan coordinates (plan01, node01) are the current positions of the task data instance DN21 when executing the target project.

In this embodiment, the task data instance DN21 may also include structural data such as a data ontology identifier, a variable, and a document image. The data ontology identifier indicates a specific source data type. The variable indicates the process variable carried when executing the target project. The document image indicates an image of a document (e.g., a purchase requisition and a purchase order). In this embodiment, the task data instance DN21 may also include a purchase requisition corresponding to the source data instance DN11 and a document mapping such as a purchase order corresponding to the source data instance DN13.

Continuing with the above description, the mapping table DN3 indicates the mapping relationship between the task data instance DN21 and the source data instances DN11 and DN13. Taking the task data instance DN21 as an example, the mapping table DN3 includes a plurality of columns DN31 to DN32 related to the task data instance DN21. In detail, the column DN31 may include an identifier denoted as "inst001", an identifier denoted as "data001", and plan coordinates denoted as "plan01, node01", so as to indicate the location ("plan01, node01") of the task data instance DN21 in the target project to access the source data instance DN11 corresponding to the purchase requisition. Further, the column DN32 may include an identifier denoted as "inst001", an identifier denoted as "data003", and plan coordinates denoted as "plan02, node03", so as to indicate another location ("plan02, node03") of the same task data instance DN21 in the target project to access the source data instance DN13 corresponding to the purchase order.

Figure 6:
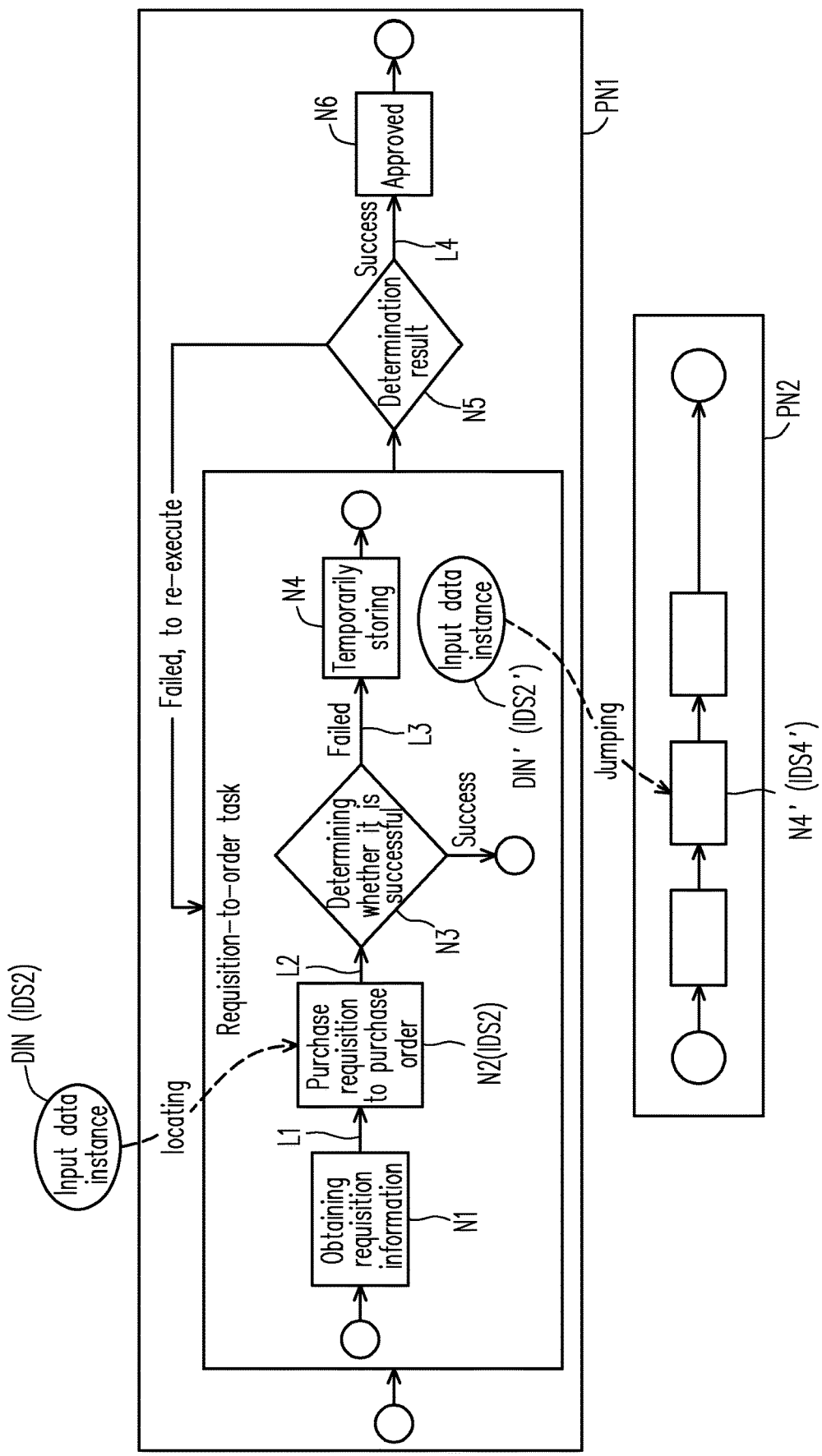
FIG. 6 is a schematic diagram of an operation performed by the processing system in a running phase according to an embodiment of the disclosure.

FIG. 6 is a schematic diagram of an operation performed by the processing system in the running phase according to an embodiment of the disclosure. With reference to FIG. 1 and FIG. 6, the processing system 100 of the project process operates in the running phase. The implementation details of step S240 are illustrated by examples.

In the running phase, the processor 120 accesses the input data in the enterprise system 200 that is substituted into the process for processing. The processor 120 instantiates the input data into the input data instance DIN based on the aforementioned data instance system. That is, the input data instance DIN may be, for example, the task data instance DN21 as shown in FIG. 5. The input data instance DIN may include plan coordinates IDS2 denoted "plan01, node01".

In this embodiment, since the input data instance DIN carries the plan coordinates IDS2 and the node N2 in the target project has the same plan coordinates IDS2, the processor 120 locates the input data instance DIN on the plan coordinates IDS2. That is, the processor 120 specifies the node N2 of the position in the first plan PN1 to execute the input data instance DIN according to the plan coordinates IDS2. Next, the processor 120 starts executing the input data instance DIN in the node N2, and after completing the operation in the node N2, the processor 120 points to the next node N3 according to the process.

In some applications, since the input data instance DIN carries variables, when the input data instance DIN is changed to an input data instance DIN' during the running phase, the processor 120 jumps the input data instance DIN' to the corresponding position according to the changed plan coordinates IDS2' of the input data instance DIN'. The aforementioned position may be, for example, a node N4' in another plan PN2. This node N4' has the same plan coordinates IDS4' as the plan coordinates IDS2'.

It can be understood that the designed multiple plans PN1 to PN2 constitute a map (i.e., target project). As long as a starting position of the input data instance DIN is specified, various input data instances DIN may freely shuttle in this map and continue to be executed according to the corresponding plan.

Figure 7A:
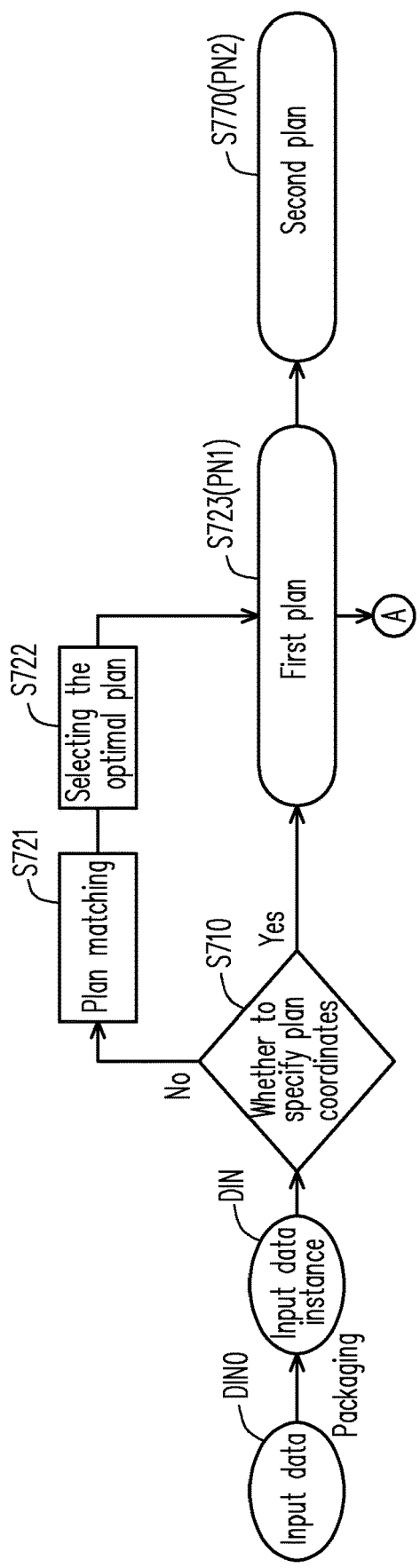
FIG. 7A to FIG. 7C are schematic diagrams of operations performed by the processing system in the running phase according to another embodiment of the disclosure.
Figure 7B:
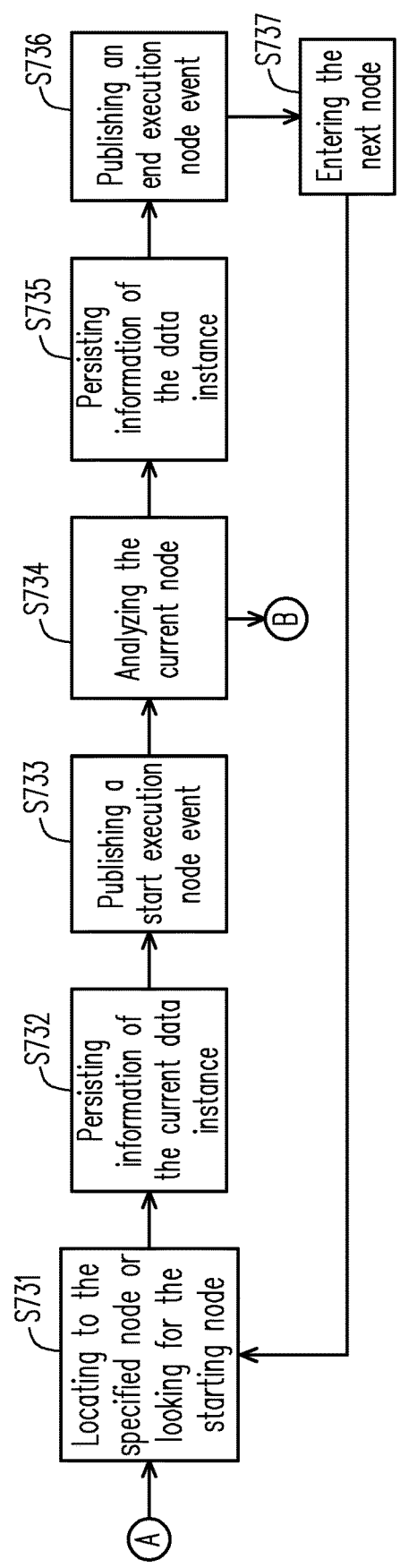
Figure 7C:
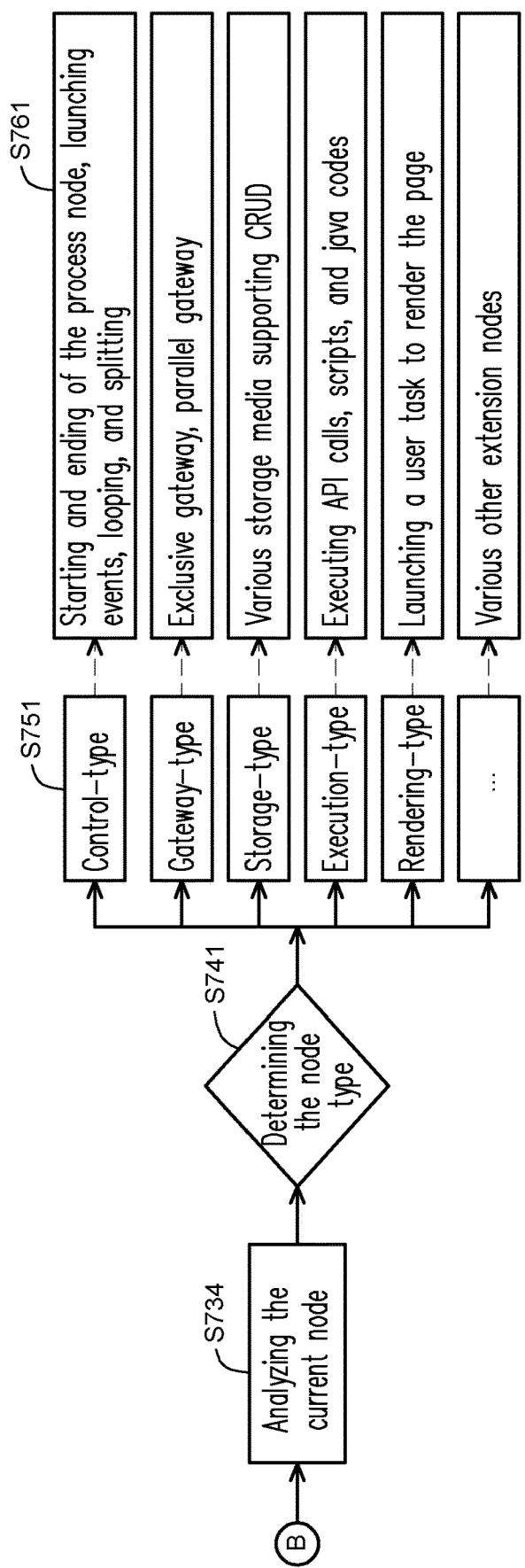

FIG. 7A to FIG. 7C are schematic diagrams of operations performed by the processing system in the running phase according to another embodiment of the disclosure. With reference to FIG. 1, FIG. 7A, and FIG. 7C, the processing system 100 of project process operates in the running phase and executes a plurality of steps S710 to S770. The implementation details of step S240 are illustrated by examples.

In the running phase shown in FIG. 7A, the processor 120 packages (i.e., instantiates) the input data DINO in the enterprise system 200 into an executable input data instance DIN of the project. In step S710, the processor 120 determines whether the input data instance DIN specifies the plan coordinates IDS2 in the project according to the input data instance DIN. When the input data instance DIN does not specify the p's IDS2, it means that the input data instance DIN does not carry the plan coordinates IDS2, so the processing system 100 proceeds to steps S721 to S722.

In step S721, the processor 120 performs plan matching calculation according to the input data instance DIN. In detail, the processor 120 calculates the input data instance DIN according to the mapping table DN3 to find one or more recommendation plans with a matching data structure. In this embodiment, the user and the processing system 100 performs processing (e.g., selecting) a specific matching plan to continue the project in an alternating manner. In step S722, the user and the processing system 100 select an optimal plan (e.g., first plan PN1) in an alternating manner to assign the input data instance DIN to this plan PN1 to proceed to step S723.

On the other hand, when the input data instance DIN specifies the plan coordinates IDS2, it means that the input data instance DIN carries the plan coordinates IDS2, so the processing system 100 assigns the input data instance DIN to the first plan PN1 to proceed to step S723. In step S723, taking the specified or selected first plan PN1 as an example, the processor 120 executes the first plan PN1 by executing steps S731 to S737. In this embodiment, after the execution of the first plan PN1 is completed, the processor 120 proceeds to step S770 to execute the second plan PN2 according to the current data instance to complete the entire process project.

In the running phase shown in FIG. 7B, the processor 120 executes the first plan PN1. In detail, in step S731, the processor 120 locates the input data instance DIN to a specified node (e.g., node N2 in FIG. 6) in the first plan PN1 according to the specified plan coordinates IDS2. Alternatively, in step S731, when the input data instance DIN does not specify the plan coordinates IDS2, the processor 120 looks for a starting node (e.g., node N2 of FIG. 6) with a matching data structure in the first plan PN1.

In step S732, the processor 120 persists the information of the current data instance (i.e., input data instance DIN). The foregoing information is, for example, a process variable including the input data instance DIN. In step S733, the processor 120 launches a start execution node event. In step S734, the processor 120 analyzes the current node (e.g., node N2 in FIG. 6). That is, the processor 120 determines the component type included in the node according to the node type of the current node, so as to perform the corresponding analyzing operation through the steps shown in FIG. 7C.

In the running phase shown in FIG. 7C, in step S741, the processor 120 determines the node type of the current node. For instance, in step S751, the processor 120 determines that the node type of the current node is a control type, it means that this node includes one or more control-type components. In step S761, when the node type of the current node is a control type, the processor 120 obtains a component related to this control-type node to perform operations such as starting and ending of the process node, launching events, looping, and splitting.

In other examples of the node types, the processor 120 determines that the node type of the current node is a gateway type, it means that this node includes one or more control-type components. The processor 120 obtains a component related to this node to execute operations such as an exclusive gateway and a parallel gateway. Alternatively, the processor 120 determines that the node type of the current node is a storage type, it means that this node includes one or more storage-type components. The processor 120 obtains a component related to this node to perform operations that support create, read, update, and delete (CRUD) on various storage media.

For another example, the processor 120 determines that the node type of the current node is an execution type, it means that this node includes one or more execution-type components. The processor 120 obtains a component related to this node to perform operations such as executing API calls, scripts, and java codes. Alternatively, the processor 120 determines that the node type of the current node is a rendering type, it means that this node includes one or more UI components. The processor 120 obtains a component related to this node to execute operations such as initiating a manual task to render a page. Alternatively, the processor 120 determines that the node type of the current node is another node type, so that the processor 120 obtains a component related to this the node to perform operations such as executing various other extended nodes.

Returning to the running phase shown in FIG. 7B, the processor 120 executes steps S735 to S737 after executing the current node N2. In step S735, the processor 120 persists the information of the executed current data instance (i.e., the input data instance DIN substituted into the node N2). The foregoing information is, for example, a process variable including the current data instance. In step S736, the processor 120 launches an end execution node event. In step S737, the processor 120 outputs the executed current data instance to enter the next node (e.g., node N3 in FIG. 6) and repeatedly executes steps S731 to S737 according to the current data instance.

It should be noted that since the project is a data-based design process, the data instance in the running phase may be split, merged, or changed, so that the processor 100 continues to execute the processed data instance in the corresponding specified plan coordinates.

Figure 8A:
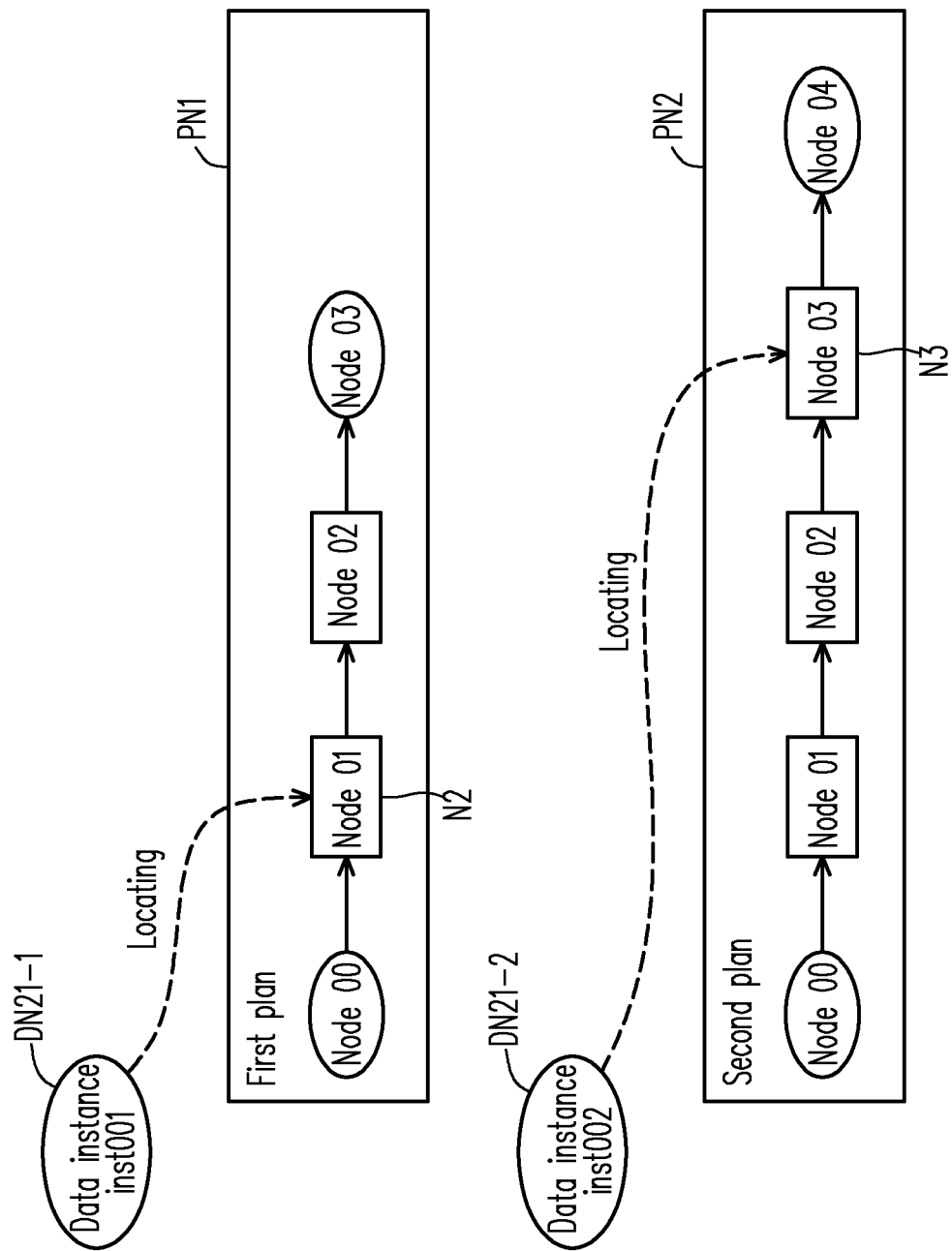
FIG. 8A to FIG. 8B are schematic diagrams of operations performed by the processing system in the running phase according to another embodiment of the disclosure.
Figure 8B:
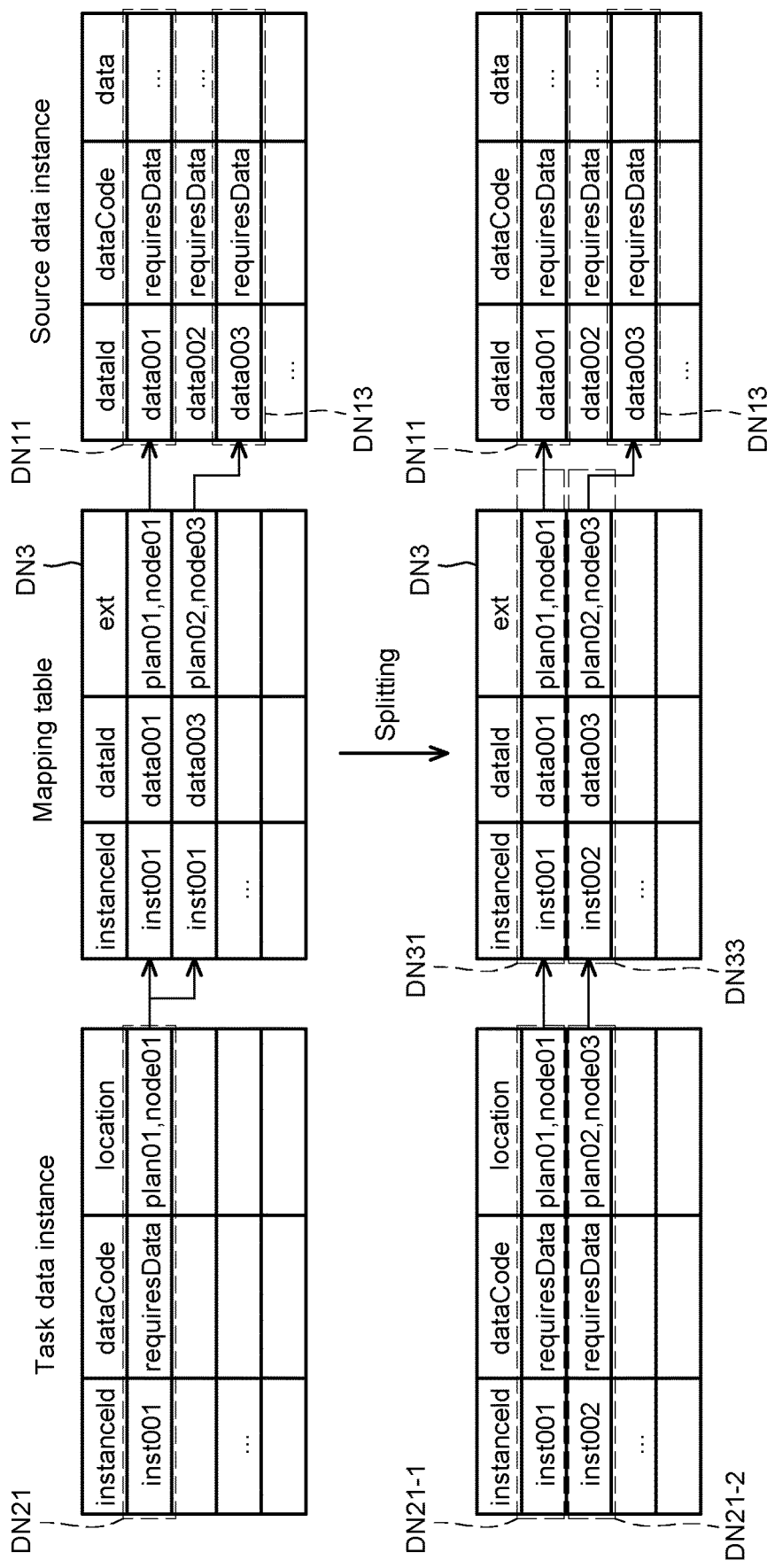

FIG. 8A to FIG. 8B are schematic diagrams of operations performed by the processing system in the running phase according to another embodiment of the disclosure. With reference to FIG. 1, FIG. 8A, and FIG. 8B, the processing system 100 of the project process operates in the running phase. The implementation details related to a split operation are illustrated by examples.

Taking the input data instance DIN as a specific task data instance DN21 (hereinafter referred to as the input data instance DN21) as an example, according to the mapping table DN3, the input data instance DN21 includes document mapping such as the purchase requisition corresponding to the source data instance DN11 and the purchase order corresponding to the source data instance DN13. For the input data instance DN21, reference may be made to the description of the task data instance DN21 in FIG. 5 and may also be deduced by analogy.

As shown in FIG. 8B, in the running phase, the processor 120 splits the input data instance DN21 into a first data instance DN21-1 and a second data instance DN21-2 according to the mapping table DN3. The first data instance DN21-1 includes a fourth identifier denoted as "inst001" and includes plan coordinates denoted as "plan01, node01". The second data instance DN21-2 includes a fourth identifier denoted as "inst002" and includes plan coordinates denoted as "plan02, node03". That is, the processor 100 splits the original input data instance DN21 into two data instances DN21-1 and DN21-2. The first data instance DN21-1 is a copied data instance to include part of the data in the original input data instance DN21. The second data instance DN21-2 is a newly-created data instance to separate other data from the original input data instance DN21.

In this embodiment, according to the column DN31 in the mapping table DN3, the first data instance DN21-1 indicates that the source data instance DN11 corresponding to the purchase requisition is accessed at the corresponding plan coordinates ("plan01, node01"). In addition, according to the column DN33 in the mapping table DN3, the second data instance DN21-2 indicates that the source data instance DN13 corresponding to the purchase order is accessed at the corresponding plan coordinates ("plan02, node03").

As shown in FIG. 8A, in the running phase, after the input data instance DN21 is split, the processor 120 specifies the corresponding node N2 among the plurality of nodes as the starting node for executing this first data instance DN21-1 in the target project according to the plan coordinates ("plan01, node01") of the first data instance ("inst001") DN21-1. The aforementioned node N2 has the same plan coordinates as the first data instance DN21-1 and may be, for example, the node N2 denoted as "node 01" in the first plan PN1.

In addition, in the running phase, after the input data instance DN21 is split, the processor 120 specifies the corresponding node N3 among the plurality of nodes as the starting node for executing this second data instance DN21-2 in the target project according to the plan coordinates ("plan02, node031") of the second data instance ("inst002") DN21-2. The aforementioned node N3 has the same plan coordinates as the second data instance DN21-2 and may be, for example, the node N3 denoted as "node 03" in the second plan PN2.

Figure 9:
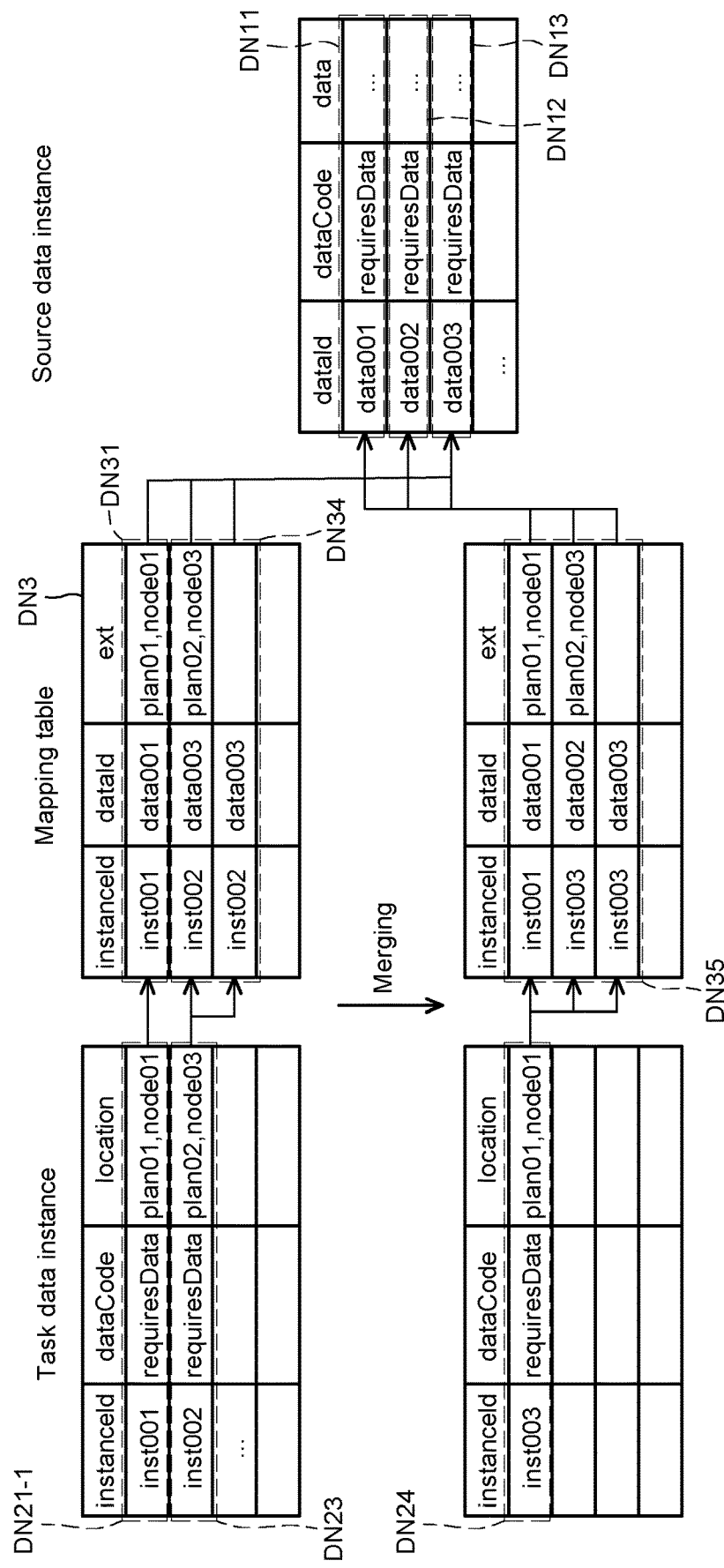
FIG. 9 is a schematic diagram of an operation performed by the processing system in the running phase according to another embodiment of the disclosure.

FIG. 9 is a schematic diagram of an operation performed by the processing system in the running phase according to another embodiment of the disclosure. With reference to FIG. 1 and FIG. 9, the processing system 100 of the project process operates in the running phase. The implementation details related to a merge operation are illustrated by examples.

Taking the input data instance DIN as a specific task data instance DN21-1 (hereinafter referred to as the input data instance DN21-1) as an example, according to the column DN31 in the mapping table DN3, the input data instance DN21-1 includes document mapping such as the fourth identifier denoted as "inst001", the plan coordinates denoted as "plan01, node01", and the purchase requisition corresponding to the source data instance DN11. For the input data instance DN21-1, reference may be made to the description of the first data instance DN21-1 in FIG. 8B and may also be deduced by analogy.

Taking another task data instance DN23 (hereinafter referred to as the third data instance DN23) as an example, according to the column DN34 in the mapping table DN3, the third data instance DN23 includes document mapping such as the fourth identifier denoted as "inst002", the plan coordinates denoted as "plan01, node03", other documents corresponding to the source data instance DN12, and the purchase order corresponding to the source data instance DN13. For the third data instance DN23, reference may be made to the description of the second data instance DN21-2 in FIG. 8B and may also be deduced by analogy.

As shown in FIG. 9, in the running phase, the processor 120 merges the input data instance DN21-1 and the third data instance DN23 into a fourth data instance DN24 according to the mapping table DN3. The fourth data instance DN24 includes a fourth identifier denoted as "inst003" and includes plan coordinates denoted as "plan01, node01". According to the column DN35 in the mapping table DN3, the merged fourth data instance DN24 also includes document mapping such as the purchase requisition corresponding to the source data instance DN11, other documents corresponding to the source data instance DN12, and the purchase order corresponding to the source data instance DN13. That is, the processor 100 integrates the existing multiple data instances DN21-1 and DN24 into a new data instance to merge all the data in these data instances DN21-1 and DN24.

In the running phase, after the data instances DN21-1 and DN24 are merged, the processor 120 specifies the corresponding fourth node among the plurality of nodes as the starting node for executing this merged fourth data instance DN24 in the target project according to the plan coordinates ("plan01, node01") of the fourth data instance ("inst003"). The aforementioned fourth node has the same plan coordinates as the fourth data instance DN24 and may be, for example, the node N2 denoted as "node 01" in the first plan PN1 as shown in FIG. 8A.

Figure 10:
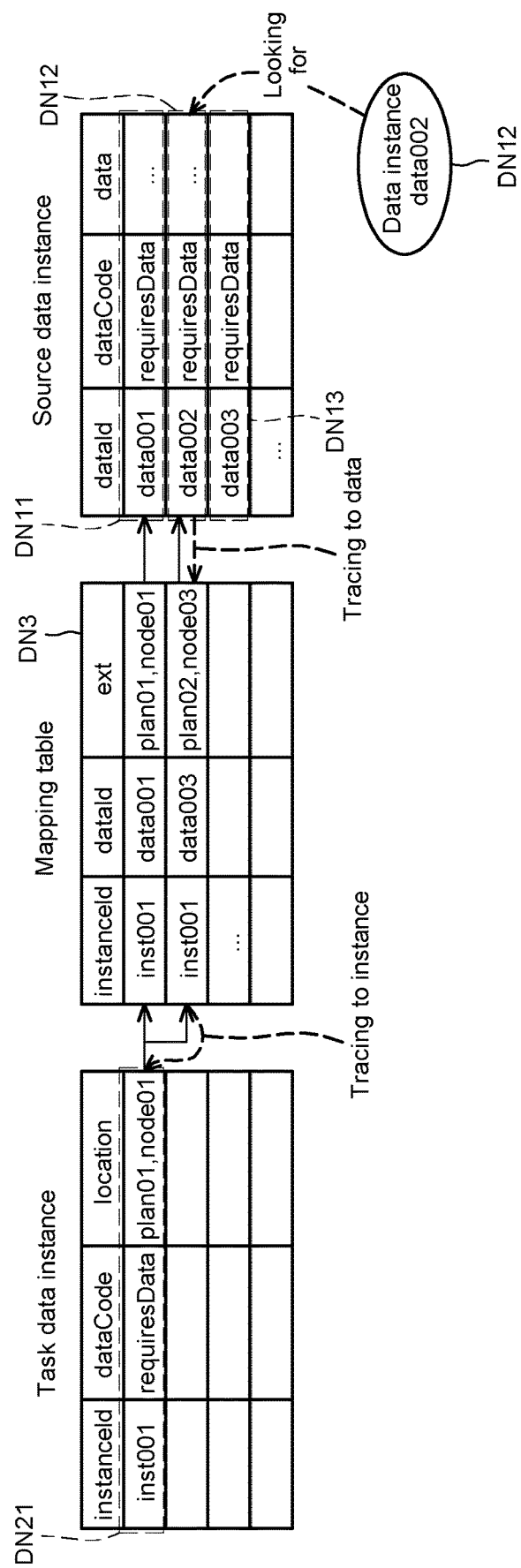
FIG. 10 is a schematic diagram of an operation performed by the processing system in the running phase according to another embodiment of the disclosure.

FIG. 10 is a schematic diagram of an operation performed by the processing system in the running phase according to another embodiment of the disclosure. With reference to FIG. 1 and FIG. 10, the processing system 100 of the project process operates in the running phase. The implementation details related to a change operation are illustrated by examples.

Taking the input data instance DIN as a specific task data instance DN21 as an example, according to the mapping table DN3, the task data instance DN21 includes document mapping such as the purchase requisition corresponding to the source data instance DN11 and the purchase order corresponding to the source data instance DN13. For the task data instance DN21, reference may be made to the description of the task data instance DN21 in FIG. 5 and may also be deduced by analogy.

As shown in FIG. 10, in the running phase, when multiple documents in the enterprise system 200 are changed, these instantiated documents (i.e., multiple source data instances DN1) are also changed correspondingly. When the documents are changed, the processor 120 accesses the task data instances associated with the changed documents according to the mapping table DN3.

Taking the source data instance DN12 denoted as "data002" as an example, it is assumed that the source data instance DN12 is changed to be modified as an additional purchase requisition. Since the purchase requisition is associated with the source data instance DN11 and it can be known that the purchase requisition is also associated with the task data instance DN21 according to the mapping table, the processor 120 traces other source data instances DN11 related to the changed source data instance DN12. Further, the processor 120 traces back to the task data instance DN21 related to this source data instance DN11.

That is, the processor 120 traces the task data instance DN21 related to the changed document according to the mapping table DN3. In this embodiment, the user and the processing system 100 process to read out the task data instance DN21 or add a mark to the task data instance DN21 for subsequent processing in an alternating manner.

In view of the foregoing, in the disclosure, the processing method and the processing system of the project process are data-based designs and operation methods. At design time, by packaging the selected components into the plan in the target project according to the matching model associated with the data, the target project of the data instance architecture can be built through the processing method. In the running phase, in the processing method, there is no need to build design instances based on process, such as process instances and node instances, so that the processing method can execute the target project in a lightweight mode. In addition, since the target project is designed based on data, in the processing method in the running phase, the current data instance can be jumped to any node in the target project or continued in any plan according to the plan coordinates of the data instance. Further, undesirable side effects such as conflicts may not occur. In some embodiments, in the processing method, operations such as splitting and merging of data instances can be performed according to the mapping table, so that the operational flexibility of the project process is improved. In some embodiments, in the processing method, when the document changes, it can be traced back to the related data instance, so that the operational flexibility of the project process is improved.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A processing method of a project process, comprising:
    defining, through a processor, a matching model according to a relationship among a plurality of pieces of document data and a relationship between the document data and a plurality of components;
    calculating, through the processor, the components according to the matching model to output a plurality of recommended components in a design phase of a target project;
    executing, through the processor, a packaging operation to form a first plan according to the components and a plurality of selected components among the recommended components in the design phase, wherein each of a plurality of nodes in the first plan comprises corresponding plan coordinates;
    specifying, through the processor, a first node among the nodes as a starting node for executing an input data instance in the target project to start executing the target project according to plan coordinates of the input data instance in a running phase, wherein the first node and the input data instance have the same plan coordinates;
    accessing, through the processor, a plurality of documents and a plurality of pieces of task data in an enterprise system, wherein each task data comprises the corresponding documents;
    instantiating, through the processor, the documents and the task data to respectively produce a plurality of source data instances and a plurality of task data instances;
    defining, through the processor, a mapping table according to a relationship between the source data instances and the task data instances; and
    splitting, through the processor, the input data instance into a first data instance and a second data instance according to the mapping table.

2. The processing method of the project process according to claim 1, further comprising:
    accessing, through the processor, a plurality of documents in an enterprise system; and
    performing, through the processor, instantiation and data mining on the documents to produce the document data and the components.

3. The processing method of the project process according to claim 1, wherein the document data and the components are respectively first multivariate structural data and second multivariate structural data, wherein the matching model comprises structural data matched with the first multivariate structural data and the second multivariate structural data.

4. The processing method of the project process according to claim 1, wherein the step of performing the packaging operation to form the first plan according to the components and the selected components among the recommended components in the design phase comprises:
    assembling, through the processor, the selected components to produce the nodes; and
    connecting, through the processor, the nodes in series according to a plurality of directed links to form the first plan.

5. The processing method of the project process according to claim 4, wherein the first plan comprises a first identifier, and the nodes comprise a plurality of different second identifiers, so that the plan coordinates of each of the nodes comprise the first identifier and the corresponding second identifier.

6. The processing method of the project process according to claim 1, wherein each of the source data instances comprises a corresponding third identifier and the corresponding document, and each of the task data instances comprises a corresponding fourth identifier and the corresponding plan coordinates.

7. The processing method of the project process according to claim 1, further comprising:
    specifying, through the processor, a corresponding second node among the nodes as a starting node for executing the first data instance in the target project according to the plan coordinates of the first data instance; and
    specifying, through the processor, a corresponding third node among the nodes as a starting node for executing the second data instance in the target project according to the plan coordinates of the second data instance.

8. The processing method of the project process according to claim 1, further comprising:
    merging, through the processor, the input data instance and the third data instance among the task data instances into a fourth data instance according to the mapping table; and
    specifying, through the processor, a corresponding fourth node among the nodes as a starting node for executing the fourth data instance in the target project according to the plan coordinates of the fourth data instance.

9. The processing method of the project process according to claim 1, further comprising:

accessing, through the processor, the task data instances associated with the changed documents according to the mapping table when the documents are changed.

10. A processing system of a project process, comprising:
a storage device storing a matching model; and
a processor coupled to the storage device and configured to execute the following operations:
defining a matching model according to a relationship among a plurality of pieces of document data and a relationship between the document data and a plurality of components;
calculating the components according to the matching model to output a plurality of recommended components in a design phase of a target project;
executing a packaging operation to form a first plan according to the components and a plurality of selected components among the recommended components in the design phase, wherein each of a plurality of nodes in the first plan comprises corresponding plan coordinates;
specifying a first node among the nodes as a starting node for executing an input data instance in the target project to start executing the target project according to plan coordinates of the input data instance in a running phase, wherein the first node and the input data instance have the same plan coordinates;
accessing a plurality of documents and a plurality of pieces of task data in an enterprise system, wherein each task data comprises the corresponding documents;
instantiating the documents and the task data to respectively produce a plurality of source data instances and a plurality of task data instances;
defining a mapping table according to a relationship between the source data instances and the task data instances; and
splitting the input data instance into a first data instance and a second data instance according to the mapping table.

11. The processing system according to claim 10, wherein the processor is further configured to execute the following operations:
accessing a plurality of documents in an enterprise system; and
performing instantiation and data mining on the documents to produce the document data and the components.

12. The processing system according to claim 10, wherein the document data and the components are respectively first multivariate structural data and second multivariate structural data, wherein the matching model comprises structural data matched with the first multivariate structural data and the second multivariate structural data.

13. The processing system according to claim 10, wherein the processor is further configured to execute the following operations:
assembling, through the processor, the selected components to produce the nodes; and
connecting, through the processor, the nodes in series according to a plurality of directed links to form the first plan.

14. The processing system according to claim 13, wherein the first plan comprises a first identifier, and the nodes comprise a plurality of different second identifiers, so that the plan coordinates of each of the nodes comprise the first identifier and the corresponding second identifier.

15. The processing system according to claim 10, wherein each of the source data instances comprises a corresponding third identifier and the corresponding document, and each of the task data instances comprises a corresponding fourth identifier and the corresponding plan coordinates.

16. The processing system according to claim 10, wherein the processor is further configured to execute the following operations:
specifying a corresponding second node among the nodes as a starting node for executing the first data instance in the target project according to the plan coordinates of the first data instance; and
specifying a corresponding third node among the nodes as a starting node for executing the second data instance in the target project according to the plan coordinates of the second data instance.

17. The processing system according to claim 10, wherein the processor is further configured to execute the following operations:
merging the input data instance and the third data instance among the task data instances into a fourth data instance according to the mapping table; and
specifying a corresponding fourth node among the nodes as a starting node for executing the fourth data instance in the target project according to the plan coordinates of the fourth data instance.

18. The processing system according to claim 10, wherein the processor is further configured to execute the following operations:
accessing the task data instances associated with the changed documents according to the mapping table when the documents are changed.

* * * * *